United States Patent Office 3,128,237
Patented Apr. 7, 1964

3,128,237
PROCESS FOR PRODUCING L-GLUTAMIC ACID
BY BACTERIAL FERMENTATION
Shinichi Motozaki, Tokyo, Toshinao Tsunoda, Zushi, Shinji Okumura, Tokyo, Hiroshi Okada, Kawasaki, and Asaichiro Ozaki and Tomoyuki Ishikura, Tokyo, Japan, assignors to Ajinomoto Co., Inc., and Sanraku Distillers Co., Inc., Tokyo, Japan
No Drawing. Filed Feb. 24, 1961, Ser. No. 109,234
9 Claims. (Cl. 195—47)

The present invention relates to a fermentative process for producing L-glutamic acid by cultivating a newly isolated species of bacteria in a special culture medium, and more particularly to a fermentative process for producing L-glutamic acid by cultivating a strain of *Brevibacterium lactofermentum* nov. sp.[1] in a sugar-containing culture medium added with vitamin $B_1$ (thiamine) or its derivatives under aerobic conditions.

In accordance with this invention, L-glutamic acid may be accumulated in a high concentration and in a short duration in the culture liquor, thus the fermentative production of L-glutamic acid in an industrial scale being remarkably facilitated.

Further objects will become apparent from the following specification.

The new species, *Brevibacterium lactofermentum*, was isolated for the first time by the inventors from the natural world and found distinctly different from all the known species of bacteria. The fact that *Brevibacterium lactofermentum* nov. sp. differs from all the heretofore known L-glutamic acid producing bacteria such as *Pseudomonas fluorescens, Esherichia coli, Aerobacter aerogenes, Bacillus subtilis, Micrococcus glutamicus* and fungi of genus Cephalsporium will be clearly understood from Table 1 which discloses the characteristics of *Brevibacterium lactofermentum* nov. sp. and Table 2 which illustrates the comparison of the new species with the above-said heretofore known L-glutamic acid producing bacteria. Fungi are extremely different from bacteria and accordingly the items regarding genus of Cephalosporium are not listed in Table 2.

---

[1] Strain 2256 of *Brevibacterium lactofermentum* nov. sp. is on deposit with the American Type Culture Collection under ATCC No. 13869 and Strain 2362 of *Brevibacterium lactofermentum* nov. sp. is on deposit there under ATCC No. 13655.

TABLE 1
*Characteristics of* Brevibacterium lactofermentum
*nov. sp. (No. 2256 and No. 2362)*

A. Morphological characteristics:
  (1) Vegetative cells: rods, usually 0.5–0.9μ x 1.0–1.4μ, spherical form not observed, occurring singly and in pairs.
  (2) Motility: none.
  (3) Spore formation: none.
  (4) Gram strain: positive.

B. Cultural characteristics:
  (1) Nutrient broth: no surface growth, slightly turbid, scant sediment.
  (2) Agar stroke: moderate, dryish, not raised, butyrous, dull lustrous and opaque growth; filiform and sometimes beaded; chromogenesis of stroke is usually yellow to pale yellow in young stage and yellow increases with aging.
  (3) Agar colony: usually small circle, scarcely making larger on bouillon agar, smooth and sometimes slightly raised at center of colony.
  (4) Gelatin stab culture: growth on surface and line of stab, no liquefaction.
  (5) Litmus milk culture: acid production, coagulation and decolorization, sometimes no coagulation.

C. Physiological characteristics:
  (1) Relation to free oxygen: facultatively anaerobic.
  (2) Pathway of carbohydrate metabolism by Liefson's method (Journal of Bacteriology, vol. 66, pp. 24–26 (1953)): fermentative metabolism of glucose and lactose.
  (3) pH for growth: optimum about 7.0, growth in the range of 5.3 to 8.4.
  (4) Temperature for growth: optimum 30–37° C., no growth at 42° C.
  (5) Nitrite production from nitrate: positive.
  (6) Hydrolysis of starch: negative.
  (7) MR and VP reaction: both positive.
  (8) Growth in Hucker's medium: usually slight, but the growth varied with the inoculum size.
  (9) Indole production: negative.
  (10) Production of $H_2S$: negative.

Note 1.—Above said characteristics of *Brevibacterium lactofermentum* were determined by the experiments in accordance with "The Manual of Methods for Pure Culture Study of Bacteria" (1946), published from Society of American Bacteriologists.

Note 2.—Our newly found bacteria belong to the genus Brevibacterium Breed as classified in the "Bergey's Manual of Determinative Bacteriology" (1957, 7th ed.).

TABLE 2
*Comparison of* Brevibacterium lactofermentum
*With Other Microorganisms*

| | Ps. fluorescens | E. coli | A. aerogenes | B. subtilis | M. glutamicus | Brev. lactofermentum |
|---|---|---|---|---|---|---|
| Spore formation | − | − | − | + | − | − |
| Gram stain | − | − | − | + | + | + |
| Motility | + | ± | ± | + | − | − |
| Free oxygen for growth | + | ± | ± | + | + | ± |
| Chromogenesis | yellow fluorescens | none | none | none | yellow | yellow |
| Gelatin lique faction | + | − | − | + | − | − |
| Litmus milk | P | AC | AC | P | − | AC |
| Indole production | − | + | + | − | − | − |
| $H_2S$ production | ± | ± | + | ± | − | − |
| Nitrite produced from nitrate | + | + | + | + | + | + |
| Methyl red test | ± | + | − | ± | − | + |
| Voges Proskauer test | − | − | + | + | − | + |
| Hydrolysis of starch | − | − | − | + | − | − |
| Utilization of $NH_3$ for growth | + | + | + | + | + | + |
| Catalase | + | + | + | + | + | + |
| Glucose fermentation | A | AG | AG | A | A | A |
| Lactose fermentation | − | AG | AG | − | − | A |
| Xylose fermentation | − | AG | AG | A | − | A |
| Dextrin fermentation | − | A | A | A | − | A |

A, acid; G, gas; C, coagulation; P, peptonization.

(11) Urease: positive.

(12) Fermentation of various sugars: acid production from various sugars and no gas production; acid from xylose, glucose, fructose, galactose, mannose, lactose, sucrose, maltose, threhalose, melezitose, cellobiose, raffinose, dextrin, mannitol, salicin and esculin.

Our newly found bacteria distinctly differ from many other species, which belong to the genus Brevibacterium, in view of the special characteristics such as lactose fermentation. We accordingly recognized said bacteria as a new species of the genus Brevibacterium and named said species as *Brevibactrium lactofermentum* in the light of their faculty of lactose fermentation.

It was found by the inventors that *Brevibacterium lactofermentum* produces L-glutamic acid with higher yield in shorter period of cultivation compared with each of heretofore known L-glutamic acid producing microorganisms, when inoculated in a synthetic medium containing, for example, inorganic salts, sugars, urea, amino acids and biotin and subjected to aerobic culture such as air-flow, shaking-agitating culture.

It was further found that the concentration of L-glutamic acid amounts to as high as more than 5.0 g./dl. (gram per deciliter) when *Brevibacterium lactofermentum* is cultured under aerobic conditions in such a medium that contains vitamin $B_1$ (thiamine) or its derivatives such as thiamine propyl disulfite or dibenzoyl thiamine besides said components. Table 3 illustrates how remarkable differences of effects are brought by the addition of vitamin $B_1$ to the culture medium. The synthetic medium respectively contained 10% of glucose and was subjected to a flask shaking culture for 40 hours. The conditions were the same as in Example 1 except that 2.4% of urea was used as the nitrogen source instead of 2.0% of ammonium sulfate.

In the table, "consumption of sugar" and "accumulation of L-glutamic acid" are respectively the percentage based on the initial amount of glucose used.

TABLE 3

| Brev. lacto-fermentum | Vitamin $B_1$, 200 $\gamma$/l. | | | Vitamin $B_1$, 0 $\gamma$/l. | | |
| --- | --- | --- | --- | --- | --- | --- |
| | Growth of bacteria (turbidity) | Consumption of sugar (percent) | Accumulation of L-glut. a. (percent) | Growth of bacteria (turbidity) | Consumption of sugar (percent) | Accumulation of L-glut. a. (percent) |
| No. 2362 | 0.69 | 99.2 | 54.4 | 0.25 | 14.2 | 4.2 |
| No. 2256 | 0.76 | 98.1 | 53.2 | 0.60 | 65.1 | 24.3 |

As clearly understood from the comparison, the addition of vitamin $B_1$ facilitates the growth of the bacteria, accelerates the consumption of sugar and increases the production of L-glutamic acid in high degrees. Although there is a certain difference between the L-glutamic acid producing power of the strains No. 2362 and No. 2256 when vitamin $B_1$ is not added to the cluture medium, vitamin $B_1$ is indispensable for obtaining such a high yield of L-glutamic acid as more than 50% and for bringing such a high concentration as more than 5.0 g./dl.

Such distinguished effects to be brought by using *Brevibacterium lactofermentum* and vitamin $B_1$ in accordance with this invention are recognized also in cases where other sugars such as fructose, sucrose, lactose or the like are used instead of glucose as the carbon source, as shown in Table 4. These experiments also were carried out by flask shaking culture using a culture medium respectively containing 10% of each sugar for 40 hours under the same conditions as in Example 1 except that 2.4% of urea was used instead of 2.0% of ammonium sulfate.

TABLE 4

| Kind of sugars | Vitamin $B_1$, 200 $\gamma$/l. | | | Vitamin $B_1$, 0 $\gamma$/l. | | |
| --- | --- | --- | --- | --- | --- | --- |
| | Growth of bacteria (turbidity) | Consumption of sugar (percent) | Accumulation of glut. a. (percent) | Growth of bacteria (turbidity) | Consumption of sugar (percent) | Accumulation of glut. a. (percent) |
| Glucose | 0.69 | 99.2 | 54.4 | 0.25 | 14.2 | 4.2 |
| Fructose | 0.59 | 87.2 | 36.3 | 0.22 | 11.3 | 3.2 |
| Maltose | 0.51 | 33.0 | 15.4 | 0.17 | 9.1 | 2.8 |
| Sucrose | 0.61 | 85.5 | 29.9 | 0.21 | 11.9 | 4.1 |
| Lactose | 0.43 | 79.3 | 32.9 | 0.18 | 12.0 | 4.3 |
| Hycrolyzate of starch | 0.68 | 92.3 | 51.8 | 0.33 | 21.3 | 6.4 |

Effects of various concentrations of vitamin $B_1$ on L-glutamic acid production were studied by the inventors and at least 20$\gamma$ per liter was found to be necessary for industrial fermentation for producing L-glutamic acid, as illustrated in Table 5.

TABLE 5

| Vitamin $B_1$ ($\gamma$/l.) | 0 | 10 | 20 | 100 | 1,000 | 10,000 |
| --- | --- | --- | --- | --- | --- | --- |
| Yield of glut. acid (percent) | 1.2 | 3.2 | 34.9 | 49.3 | 53.8 | 52.1 |
| Consumption of sugar | 20.4 | 32.9 | 80.3 | 97.3 | 98.2 | 99.3 |

The experimental conditions were the same as in Example 1 except that 2.4% of urea was used as the nitrogen source instead of 2.0% of ammonium sulfate.

Similar effects were recognized in the experiments wherein derivatives of vitamin $B_1$ such as thiamine-propyl disulfite were used instead of vitamin $B_1$ per se, as shown in Table 6. The experimental conditions were the same as in the foregoing experiments, where vitamin $B_1$ per se was used.

TABLE 6

| Thiamine-propyl disulfite ($\gamma$/l.) | 0 | 200 | 1,000 | 10,000 |
| --- | --- | --- | --- | --- |
| Yield of glutamic acid (percent) | 3.6 | 45.9 | 49.8 | 47.5 |
| Consumption of sugar (percent) | 11.7 | 87.9 | 94.3 | 91.9 |

Another necessary raw material other than carbon source in the fermentative production of L-glutamic acid is nitrogen source. It was further found that continuous introduction of ammonia gas into the culture medium during the aerobic culture simultaneously conducts the quadruple actions-supply of nitrogen source necessary for growth of bacterial cells, supply of $NH_2$-nitrogen necessary for constitution of L-glutamic acid molecule, neutralization of fermentatively produced L-glutamic acid and by-produced organic acids and continuous maintenance of optimum pH of the culture medium.

Ordinary means for conducting those four actions such as ammonium salt and lime method, ammonium salt and ammonia water method, urea and urea method, urea and ammonia water method or the like respectively have at least a certain inevitable defect such as low yield of glutamic acid, slowness of sugar consumption, long period of fermentation or the like, the fermentative production of L-glutamic acid being led unfavorably thereby. Table 7 illustrates how ammonia gas method predominates over abovesaid ordinary means in all respects.

TABLE 7

| N-source added | Neutralizer | Fermentation period (hrs.) | Variation of pH during fermentation | Concentration of produced glut. acid (g./dl.) | Yield of glut acid (percent) |
|---|---|---|---|---|---|
| Amm. sulfate, 2.0% | CaCO³, 5% | 50 | 5.0–6.8 | 1.63 | 7.4 |
| Urea, 2.5% | None | 50 | 6.5–8.7 | 2.32 | 19.3 |
| Urea, 0.8% | Ammonia water,* 6 ml./dl. | 50 | 6.8–8.3 | 4.13 | 36.1 |
| Amm. gas | Ammonia gas | 40 | 7.6–7.8 | 5.98 | 49.6 |

The above experiments were carried out under the same conditions as in Example 4 except that 12% of glucose was used as the carbon source instead of 12.83% of sugars obtained by hydrolyzing sweet potato starch. The concentration of ammonia water* used was 28%. The cause for the superiority of ammonia gas method may presumably be attributed mainly to easiness of continuous maintenance of the optimum pH for the culture. Moreover, such superior effect increases as the concentration of sugar used is increased and this fact is extremely important in the actual production of glutamic acid in an industrial scale. Introduction of ammonia gas into the culture medium may be simply carried out by mixing ammonia gas into air to be introduced into the medium in order to keep it under aerobic condition. Ammonia gas is thus diluted by the air necessary for the aerobic culture and accordingly the predetermined range of pH may be minutely adjusted.

After many experiments, the inventors further found that the preferable range of pH of the culture medium which is to be kept within is from 7.4 to 8.3 and the optimum range is from 7.6 to 7.8 as shown in Table 8. The experimental conditions were the same as in Example 3 except that 10% of glucose was used instead of 10.3% of sugars obtained by hydrolyzing sweet potato starch.

TABLE 8

| pH kept through | Fermentation period (hrs.) | Yield of L-glutamic acid (Percent) |
|---|---|---|
| 7.2 | 42 | 40.1 |
| 7.4 | 38 | 45.3 |
| 7.6 | 32 | 50.4 |
| 7.8 | 34 | 50.6 |
| 8.0 | 39 | 48.2 |
| 8.3 | 49 | 39.7 |

In a typical example carried out according to the present invention wherein the pH was kept within 7.6–7.8, the relations among growth of cells of *Brevibacterium lactofermentum*, accumulation of L-glutamic acid and consumption of glucose was as follows:

Growth of bacterial cells (permeability) begun with beginning of fermentation, then gradually increased up to about 0.75 until 20 hrs. and after that time was maintained almost at the same degree. Consumption of glucose suddenly increased after about 5 hrs. until 25 hrs. and since then gradually increased. Concentration of glucose remained in the medium was approximately 1.95 g./dl. after 25 hrs. and approximately 0.3 g./dl. after 30 hrs. Accumulation of L-glutamic acid suddenly increased after around 13 hrs. and since then straightly increased. The concentration of L-glutamic acid was approximately 0.95 g./dl. after 13 hrs. and approximately 5.3 g./dl. after 32 hrs.

The following examples illustrate the invention but are not to be construed as limiting the same.

EXAMPLE 1

A culture medium containing 10% of chemically pure glucose, 2.0% of ammonium sulfate, 200 γ/l. of vitamin $B_1$, 4.0 γ/l. of biotin, 0.2% of amino acids solution (soybean hydrolyzate containing 2.4% of total nitrogen), 0.1% of $KH_2PO_4$, 0.04% of $MgSO_4.7H_2O$, 0.001% of $FeSO_4$ and 0.001% of $MnSO_4$, which was contained in a shaking flask, was adjusted to pH 7.0 and sterilized at 115° C. for 10 minutes. It was incubated with cultured bacteria on bouillon-slant for 24 hrs. of *Brevibacterium lactofermentum*, Strain No. 2362, added with $CaCO_3$ previously sterilized by dry heating and subjected to shaking-agitating culture at 31° C. The culture was halted after 40 hours, when the fermentation broth contained 3.13 g./dl. of L-glutamic acid and 1.32 g./dl. of remaining glucose. The ratio of the quantity of accumulated L-glutamic acid to that of consumed sugar was 36.1%. After the bacterial cells were separated from the fermentation broth, the latter was concentrated to approximately 20% of contained glutamic acid and added with hydrochloric acid to adjust its pH to 3.2, when 83% of glutamic acid crystallized out.

EXAMPLE 2

A culture medium containing 10% of chemically pure glucose, 200 γ/l. of vitamin $B_1$, 4 γ/l. of biotin, 0.2% of amino acids solution (soy-bean hydrolyzate containing 2.4% of total nitrogen), 0.1% of $KH_2PO_4$, 0.04% of $MgSO_4.7H_2O$, 0.001% of $FeSO_4$ and 0.001% of $MnSO_4$, which was contained in a shaking flask, was adjusted to pH 6.0, sterilized at 115° C. for 10 minutes and added with 0.5% of sterilized urea. It was incubated with a cultured bacteria on bouillon-slant for 24 hrs. of *Brevibacterium lactofermentum*, Strain No. 2256, and subjected to shaking-agitating culture at 31° C. After 18 hours, 1.8% of urea was added to the broth and the culture was continued. Fermentation was concluded after 45 hours from the beginning. Concentration of L-glutamic acid was 4.83 g./dl. and the yield was 49.7% based on the quantity of glucose used.

EXAMPLE 3

A culture medium containing 10.3% of sugars obtained by hydrolyzing sweet potato starch, 100 γ/l. of vitamin $B_1$, 3.5 γ/l. of biotin, 0.2% of aforesaid amino acids solution, 0.1% of $KH_2PO_4$, 0.04% of $MgSO_4.7H_2O$, 0.001% of $FeSO_4$ and 0.001% of $MnSO_4$ was contained in a stainless steel jar fermentor of 20 liters' capacity, neutralized with ammonia and sterilized by steaming. It was incubated with 5% of a liquid culture of *Brevibacterium lactofermentum*, Strain No. 2362, obtained from a culture medium containing 5% of glucose, 0.8% of urea, 100 γ/l. of vitamin $B_1$, 3 γ/l. of biotin, 0.2% of said amino acids solution and said inorganic salts and subjected to an aerobic culture under the conditions of agitation of 600 r.p.m., air flow of ¼ volume based on the culture liquor per min. and temperature of 31° C. In the culture liquor, pH electrodes were immersed in order to automatically maintain its pH within the range of 7.6–7.8. If its pH dropped under 7.6, introduction of $NH_3$ gas into the culture liquor automatically was taken place, while, if its pH rised over 7.8, introduction of $NH_3$ gas automatically stopped. Foaming on the surface of the culture liquor was prevented by silicon resin. Fermentation was completed after 32 hours, when the concentration of L-glutamic acid amounted to 5.03 g./dl. and the yield to 50.9%.

EXAMPLE 4

A culture medium containing 12.83% of sugars obtained by hydrolyzing sweet potato starch, 200 γ/l. of vitamin $B_1$, 3.5 γ/l. of biotin, 0.2% of aforesaid amino acids solution, 0.1% of $KH_2PO_4$, 0.04% of $MgSO_4 \cdot 7H_2O$, 0.001% of $FeSO_4$ and 0.001% of $MnSO_4$ was prepared. 25 liters of said culture medium was poured into a stainless steel jar fermentor of 40 liter capacity, neutralized with ammonia and sterilized by steaming. It was incubated with 5% of a liquid culture of *Brevibacterium lactofermentum*, Strain No. 2256, having the same composition as in Example 3 and subjected to an aerobic culture under the conditions of agitation of 335 r.p.m., air flow of ⅕ volume based on the culture liquor per min. and temperature of 31° C. Control of pH and introduction of $NH_3$ gas were automatically carried out in the same way as in Example 3 and pH of the culture liquor was maintained within the range from 7.6 to 7.8. The aerobic fermentation was completed after 38 hours. Concentration of L-glutamic acid at that time was 6.43 g./dl. and the yield was 49.6%.

This is a continuation-in-part of our application Serial No. 821,651, filed June 22, 1959, now abandoned.

What we claim is:

1. A process for producing L-glutamic acid by bacterial fermentation which comprises cultivating a strain of *Brevibacterium lactofermentum* nov. sp. having the characteristic set forth in Table 1 in a fermentative culture liquor containing at least 20 γ/l. of an addition agent selected from the group consisting of vitamin $B_1$ (thiamine), thiamine propyl disulfite, and dibenzoyl thiamine, together with a source of carbon and a nitrogen source compound under aerobic conditions at a temperature within the range from about 28° C. to about 37° C. and separating thus formed glutamic acid from the fermentation broth.

2. A process for producing L-glutamic acid by bacterial fermentation as claimed in claim 1 wherein gaseous ammonia is the nitrogen source compound, and is introduced at a rate sufficient to maintain the pH of said liquor within a range from 7.4 to 8.3.

3. A process for producing L-glutamic acid by bacterial fermentation as claimed in claim 2 wherein the gaseous ammonia is diluted with air introduced into the culture liquor for creating the aerobic condition to form a mixed gas, said gas being introduced into the culture liquor when the pH thereof drops under the lower limit of said pH range by the accumulation of L-glutamic acid.

4. A process for producing L-glutamic acid by bacterial fermentation as claimed in claim 1, wherein said strain is cultivated at a pH between 7.6 and 7.8.

5. A process for producing L-glutamic acid by bacterial fermentation as claimed in claim 1, wherein said carbon source is a carbohydrate.

6. The process of claim 1, wherein Strain 2256 of *Brevibacterium lactofermentum* nov. sp. is cultivated.

7. The process of claim 1, wherein Strain 2362 of *Brevibacterium lactofermentum* nov. sp. is cultivated.

8. A process for producing L-glutamic acid by bacterial fermentation, which comprises cultivating a microorganism corresponding to ATCC No. 13655 in a fermentative culture liquor containing at least 20 γ/l. of an addition agent selected from the group consisting of thiamine, thiamine propyl disulfite and dibenzoyl thiamine, together with a source of carbon and a nitrogen source compound under aerobic conditions at a temperature within the range from about 28° C. to about 37° C., and separating thus formed glutamic acid from the fermentation broth.

9. A process for producing L-glutamic acid by bacterial fermentation, which comprises cultivating a microorganism corresponding to ATCC No. 13869 in a fermentative culture liquor containing at least 20 γ/l. of an addition agent selected from the group consisting of thiamine, thiamine propyl disulfite and dibenzoyl thiamine, together with a source of carbon and a nitrogen source compound under aerobic conditions at a temperature within the range from about 28° C. to about 37° C., and separating thus formed glutamic acid from the fermentation broth.

References Cited in the file of this patent

UNITED STATES PATENTS

| | | |
|---|---|---|
| 3,002,887 | Kinoshita et al. | Oct. 3, 1961 |
| 3,002,925 | Kinoshita et al. | Oct. 10, 1961 |

OTHER REFERENCES

Chao et al.: Journal of Bacteriology, vol. 77 (1959), pp. 715–725.

The Vitamins, vol. I, chapter IV (pages 525–618), 1954, Academic Press Inc., New York, QP801V5S33.